United States Patent [19]

Clifford et al.

[11] 4,246,504

[45] Jan. 20, 1981

[54] ELECTRIC MOTORS

[75] Inventors: Cecil F. Clifford; Laurence H. Finlayson, both of Bath, England

[73] Assignee: Horstmann Clifford Magnetics Limited, Bath, England

[21] Appl. No.: 917,574

[22] Filed: Jun. 21, 1978

[30] Foreign Application Priority Data

Jun. 30, 1977 [GB] United Kingdom ............... 27368/77

[51] Int. Cl.³ ......................................... H02K 21/26
[52] U.S. Cl. .................................. 310/181; 310/154; 310/268
[58] Field of Search ................. 310/49, 181, 155, 154, 310/162-165, 168, 268

[56] References Cited

U.S. PATENT DOCUMENTS

| 3,999,090 | 12/1976 | Sinnott | 310/49 |
| 3,999,107 | 12/1976 | Reuting | 310/181 X |

FOREIGN PATENT DOCUMENTS

| 414777 | of 0000 | United Kingdom . |
| 846203 | of 0000 | United Kingdom . |
| 1023930 | of 0000 | United Kingdom . |
| 1084479 | of 0000 | United Kingdom . |
| 1124571 | of 0000 | United Kingdom . |
| 1343372 | of 0000 | United Kingdom . |

Primary Examiner—Donovan F. Duggan
Attorney, Agent, or Firm—Emory L. Groff, Jr.

[57] ABSTRACT

An alternating current electric motor comprises a stator and a substantially flat armature of magnetic material. The armature is adapted to move relative to the stator and has a plurality of sections which are mutually spaced in the direction of intended movement of the armature. The stator has a plurality of poles having coplanar polefaces spaced apart in the direction of travel of the armature and all of the polefaces are spaced from and face one side only of the armature. At least one winding is wound upon the stator and is arranged so that upon energisation of the winding by an alternating current all of the polefaces are of like polarity and the relative flux density of adjacent ones of the polefaces is caused to alternate without polarity change about a mean value. The alternation of relative flux density of the adjacent polefaces induces movement of the armature relative to the stator.

18 Claims, 6 Drawing Figures

ELECTRIC MOTORS

BACKGROUND OF THE INVENTION

This invention relates to electric motors.

SUMMARY OF THE INVENTION

The invention seeks to provide an efficient electric motor of simple inexpensive construction which can be driven from an alternating current supply.

According to the invention there is provided an alternating current electric motor comprising a stator and a substantially flat armature of magnetic material adapted to move relative to the stator and having a plurality of sections mutually spaced in the direction of intended movement of the armature, the stator having a plurality of poles having coplanar polefaces spaced apart in the direction of travel of the armature all of which polefaces are spaced from and face one side only of the armature, and at least one winding wound upon the stator and so arranged that on energisation of the winding by an alternating current all of the polefaces are of like polarity and the relative flux density of adjacent ones of the polefaces is caused to alternate without polarity change about a mean value, thereby to induce movement of the armature relative to the stator.

In one form of the invention there is provided an alternating current motor comprising a stator and a substantially flat armature of magnetic material adapted to move relative to the stator and having a plurality of sections mutually spaced in the direction of intended movement of the armature, the stator having a plurality of poles having coplanar polefaces spaced apart in the direction of travel of the armature all of which polefaces are spaced from and face one side only of the armature the poles being situated in adjacent pairs which have their faces offset to opposite sides of an axis extending in the direction of intended movement of the armature, and at least one winding wound upon the stator and so arranged that on energisation of the winding by an alternating current all of the polefaces are of like polarity and the relative flux density of adjacent ones of the polefaces is caused to alternate without polarity change about a mean value, thereby to induce movement of the armature relative to the stator.

In a preferred form the poles are formed by permanent magnets and like polarity faces of the permanent magnets are presented to the armature.

Since the flux density of the polefaces alternates without polarity change about a mean value there are no reversals of magnetic flux in operation of the motor, and accordingly a high efficiency with minimal magnetic losses can be achieved.

The invention is in principle applicable both to linear motors and to motors having a rotary drive output, although the invention is hereinafter described in its application to a rotational electric motor.

Thus a rotary electric motor according to the invention has an armature comprising a rotor in which said sections each comprise a segment of magnetic material which extends radially of the axis of rotation of the rotor the stator poles being arranged around the axis of rotation of the rotor so that upon rotation thereof, each rotor segment intersects the magnetic flux of each poleface in turn. In another advantageous form a rotary electric motor constructed in accordance with the invention has an armature which comprises a rotor in which said sections comprise parts of a segment alternate ones of which are defined by outer and intermediate pitch circle diameters and intermediate and inner pitch circle diameters respectively and said polefaces are aligned alternately between outer and intermediate pitch circle diameters and intermediate and inner pitch circle diameters respectively. The polefaces of the stator poles preferably lie in a plane perpendicular to the axis of rotation of the rotor, which may be in the form of a flat vane spaced by an air gap from the stator polefaces.

The stator poles preferably comprise permanent magnet segments or parts of segments arranged at equal angular intervals around the axis of rotation of the rotor and superimposed upon a core carrying the motor winding or windings. The magnetic flux from the stator poles, after passing through the rotor vane, returns to the core through an air path externally of the core, while the alternating component of magnetic flux produced by the or each winding has a substantially closed magnetic circuit.

The core preferably comprises an annular outer core element coaxial with the axis of rotation of the rotor and an inner core element concentric with the outer element and defining therewith an annular gap in which the or each winding is located. In a preferred embodiment of the invention the stator pole segments are superimposed on the inner and outer core elements so that the pole segments carried by the inner core element alternate with those carried by the outer core element around the axis of the core. The stator pole segments may have equal angular width, in which case the rotor vane preferably has a number of segments of the same angular width as the pole segments. Thus in one practical embodiment of the invention the number of rotor vane segments is one half the number of stator pole segments, the rotor vane segments being spaced apart by segmental spaces of the same angular width as the rotor segments themselves.

BRIEF DESCRIPTION OF THE DRAWINGS

The invention will now be further described, by way of example only, with reference to the accompanying purely diagrammatic drawings, in which.

DESCRIPTION OF THE PREFERRED EMBODIMENTS

Figure 1:
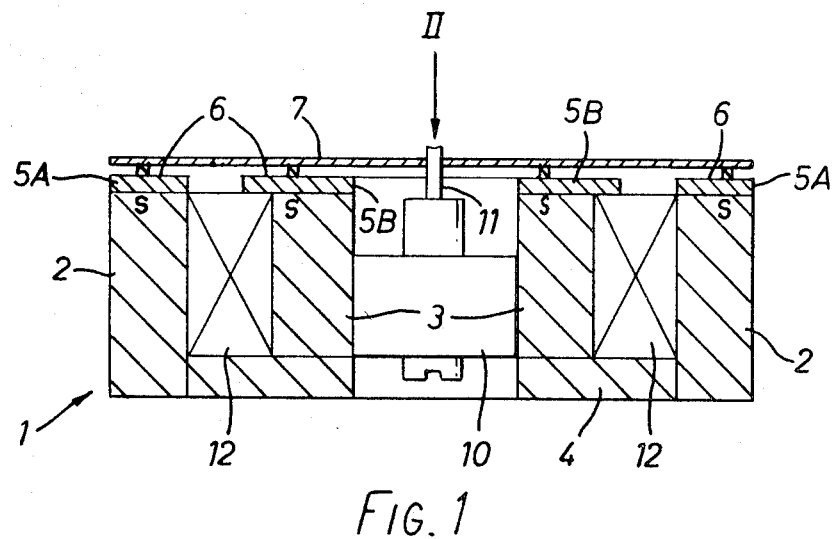
FIG. 1 is an axial cross section of an electric motor according to one embodiment of the invention.
Figure 2:
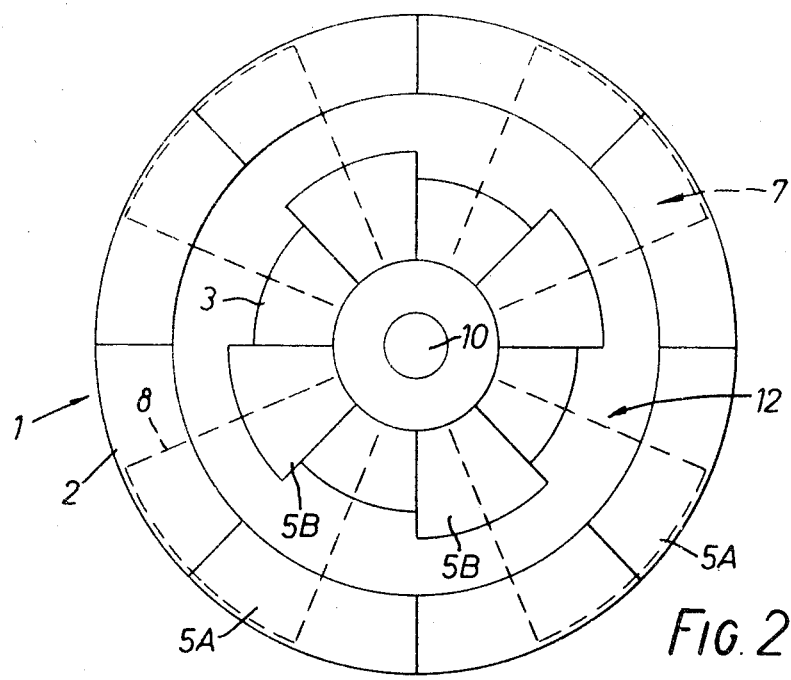
FIG. 2 is an end view of the stator of the motor, with the rotor shown dotted, and taken in the direction of arrow II of FIG. 1.
Figure 3:
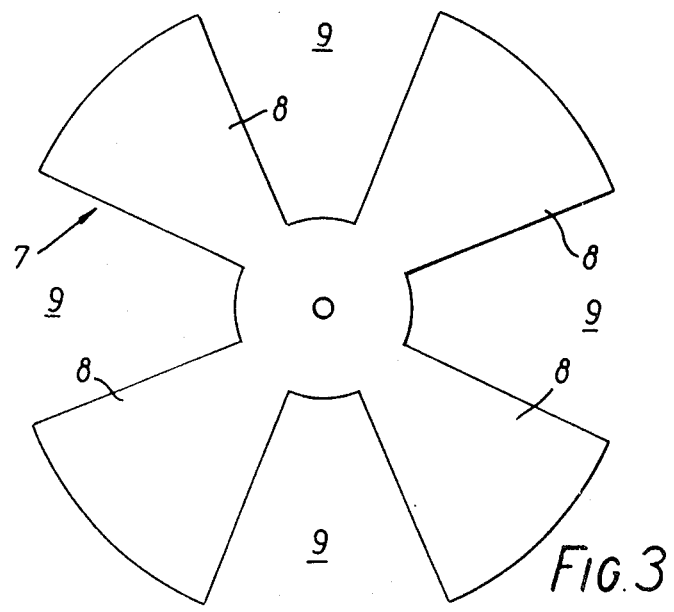
FIG. 3 is a plan view of the rotor of the motor shown in FIGS. 1 and 2.

The motor of FIGS. 1 to 3 has a stator assembly 1 comprising a pot core of magnetic material having an annular outer core element 2 and an inner core element 3 concentric with the outer element 2 and defining with the latter an annular gap, the two core elements being interconnected at one end of the stator by annular portion 4. The stator assembly 1 further comprises a number of permanent magnet stator pole segments 5A, 5B arranged at equal angular intervals about the axis of the core, alternate pole segments 5A, 5B around the core axis being carried by the outer and inner core elements 2, 3 respectively.

The permanent pole segments 5A, 5B subtend equal angular widths at the centre of the core assembly (FIG. 2). Each pole segment 5A, 5B is formed from a layer, approximately 1 mm thick, of permanent magnet material such as barium ferrite or samarium cobalt magnetised through its thickness, the direction of magnetisation of all pole segments 5A and 5B being identical, as indicated in FIG. 1. The thickness of the pole segments can be less than 1 mm if constructed from samarium cobalt. The pole segments 5A and 5B superimposed on the outer and inner core elements 2, 3 respectively have flat coplanar polefaces 6 which lie in a plane perpendicular to the axis of the stator assembly 1. A rotor in the form of a flat vane 7 (FIG. 3) of soft magnetic material is mounted with bearings spaced from the stator assembly 1 for rotation about an axis which is coaxial with the axis of the stator assembly and which is perpendicular to the polefaces 6. The rotor vane 7 is cut or stamped from a single sheet of magnetic material such as softened Mumetal, the rotor vane 7 being formed with a number of sector-shaped segments 8 of the same angular width as the pole segments 5A, 5B, spaced apart by segmental spaces 9 of the same angular width as the rotor segments themselves. Thus the number of rotor vane segments 8 will be half the total number of stator pole segments 5A, 5B—in the illustrated embodiment the rotor vane has four segments 8 and there are eight stator pole segments made up of four outer segments 5A alternating with four inner segments 5B (FIG. 2).

Conveniently the inner core element 3 of the stator assembly is of hollow tubular construction and houses in its interior a non-magnetic bearing assembly 10, for example of brass, supporting a rotor shaft 11, rotatable about the axis of the stator assembly 1, carrying the rotor vane 7. In a typical practical embodiment the rotor vane 7 will be spaced from the stator polefaces 6 by a narrow air gap of substantially the same width as the rotor vane thickness.

A motor winding 12 is wound concentrically in the annular space between the inner and outer core elements 2, 3. In a practical example of the invention the rotor winding 12 would comprise 4000 turns having a resistance of 1600 ohms. The stator core 2, 3, 4 provides a nearly closed magnetic circuit for the flux of the winding 12 in conjunction with the rotor 7, while the flux of the permanent magnetic pole segments 5A, 5B, after passing through the rotor vane 7, has an air return path.

When the rotor vane 7 is fitted to the motor, and in the rest condition of the latter, the rotor assumes a position in which its vane segments 8 each cover one half of an outer stator pole segment 5A and one half of an adjacent inner pole segment 5B, as illustrated diagrammatically by a broken outline in FIG. 2. This is an ideal position for self-starting the motor when an alternating current is applied to the motor winding 12.

Upon applying alternating current to the motor winding 12, that is, upon switching on the motor, the magnetic flux density of each of the pole segments 5A, 5B will alternate, without polarity change, about a mean value, by virtue of the alternating magnetic field of the winding 12 superimposed upon the permanent magnetic flux of the pole segment magnets 5A, 5B. For example, the flux density at the pole faces 6 may alternate cyclically between a mimimum of 1450 lines per square centimeter and a maximum of 1550 lines per square centimeter.

Commencing with the rotor vane 7 in the starting position shown in broken outline in FIG. 2, the flux from one of the two sets of pole segments, for example the outer pole segments 5A, will increase as the flux from the other set of pole segments (5B) decreases in one half cycle of the alternating supply. The rotor vane segments 8 will in consequence be displaced angularly so as to align themselves with the stronger magnetic flux from the outer pole segments 5A, and hence rotation of the rotor vane 7 will commence with a starting torque determined by the force of magnetic attraction between the rotor segments 5A and the rotor vanes 8. In the next half cycle of the supply the inner pole segments 5B will be stronger than the outer pole segments 5A, and the rotor vane 7 will therefore continue its rotation in an attempt to align its segments 8 with the inner pole segments 5B. The rotation of the rotor vane 7 continues, at a rate proportional to the frequency of the alternating current supply.

It has been found that a four pole motor according to the invention is self-starting up to a supply frequency of 30 Hz, and it is envisaged that rotors having more poles, for example twenty poles, will be self-starting at higher frequencies, of the order of 50 Hz or more.

Since no flux reversals take place in the stator or rotor a reasonably high motor efficiency of the order of 50% can be achieved along with smooth and silent running.

Although the preferred embodiment described employs permanent magnets these can be dispensed with. It has been found, as expected, that such a motor will operate if started by hand with no permanent magnets incorporated if salient poles are provided on the stator by a d.c. magnetising bias as hereinafter mentioned. The efficiency is then much lower, e.g. 8% as compared with 50% using permanent magnets. These results can be justified by the following calculation. Let $\phi_A$ be the alternating torque producing flux and $\phi_P$ the permanent magnet flux.

(a) If no permanent magnet flux, Torque $= K_1 \phi_A^2$ (b) If permanent magnets present, Torque $= K_2(\phi_P + \phi_A)^2 - (\phi_P - \phi_A)^2$ and if the geometry is the same for both there will be no change in K i.e. $K_2 = K_1$. (b) expands into $4\phi_A\phi_P$ so even if $\phi_P$ only equalled $\phi_A$ there would be a four fold gain in torque.

Experiments indicate that highest efficiency is obtained when $\phi_P = \phi_A$ but extra torque at lower efficiency can be obtained by making $\phi_P$ greater than $\phi_A$.

It has been found that slightly higher efficiency is achieved if the ends of the segments 8 are bent substantially at right angles so that the rotor to stator reluctance is reduced by making it of greater area in reluctance $= \mu$ length/area.

Also higher efficiency is achieved by making circumferential cuts in the rotor segments to interrupt the path of the unwanted eddy currents.

It has been found that the armature/rotor can also be provided with magnetic pole segments similar to the pole segments 5A and 5B and which each present the same polarity face to the stator. The displacement of such an armature upon application of an alternating current to the stator winding can be effected by attraction or repulsion. Such a rotor may be constructed of soft iron or any other suitable magnetic material.

Figure 4:
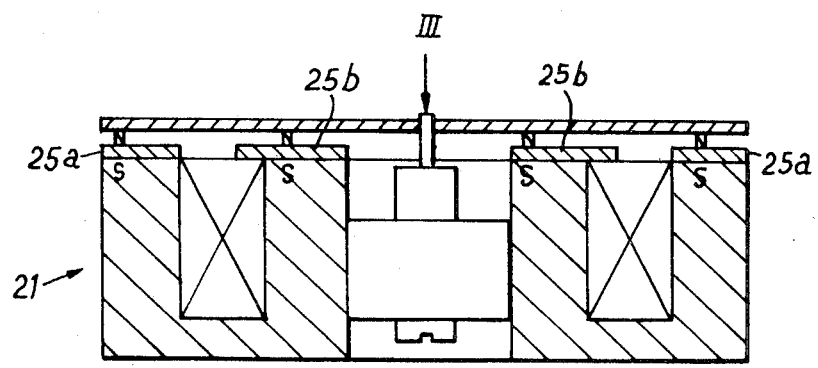
FIG. 4 is an axial cross sectional view of a second embodiment of electric motor constructed in accordance with the invention.
Figure 5:
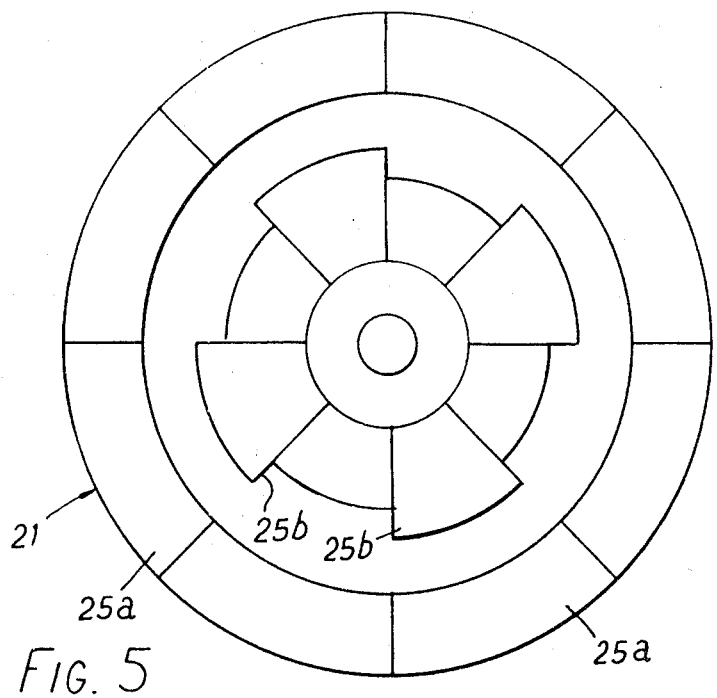
FIG. 5 is an end view of the stator of the motor of FIG. 4, taken in the direction of arrow III of FIG. 4.
Figure 6:
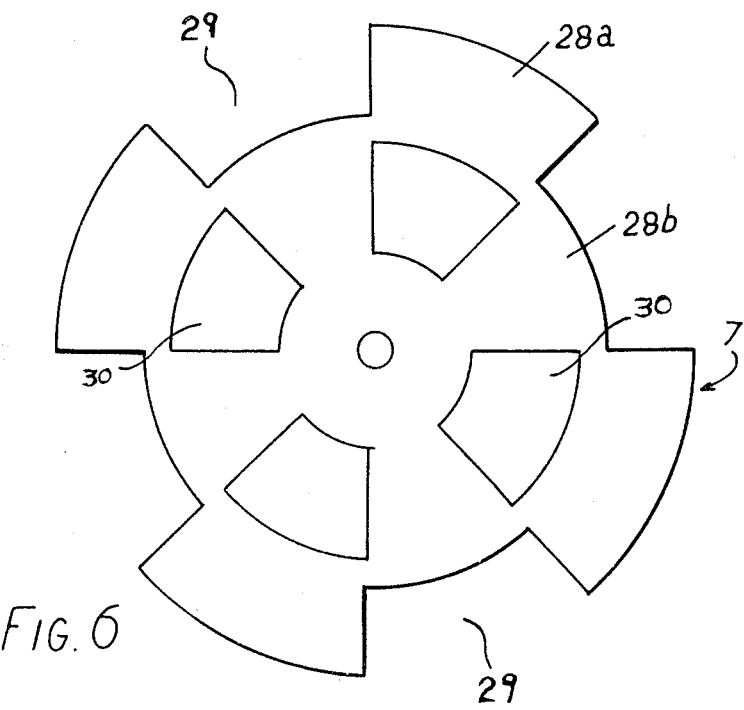
FIG. 6 is a plan view of the rotor of the motor shown in FIGS. 4 and 5.

An alternative embodiment of the invention is shown in FIGS. 4, 5 and 6 which employs a stator assembly 21 similar to the stator 1 but having pairs of stator pole segments 25a and 25b similar to segments 5A and 5B mounted in alignment on axes extending radially of the stator. In this case a rotor 7 formed from a disc of magnetic material is employed which disc is provided at its periphery with four equangularly displaced slots 29 which extend inwardly to a pitch circle diameter of (approximately ⅝ of the radius of the disc and subdivide the disc into four peripheral segments 28a.) Four apertures 30 are also provided in the disc, have ends in radial alignment with opposite ends of the segments 28a and extend from a pitch circle diameter of just less than ⅝ of the diameter of the disc to a position close to the centre of the disc. The apertures 30 subdivide the inner portion of the disc into four segments 28b disposed inwardly of the segments 28a and staggered relative thereto. Such a rotor is known as a "staggered rotor". As can be seen from FIG. 6 the segments 28a and 28b are disposed alternatively around the rotor. The rotor segments can also be provided with pole segments which present the same magnetic polarity to the stator.

Instead of forming the rotor as a flat vane it could be formed of cup or bell shape in which case the stator could be mounted inside the bell or cup.

It is also possible to dispense with the permanent magnets and to introduce an equivalent d.c. magnetising current bias for the poles of the stator via a separate winding or windings wound outside the stator core in order to make all poles present the same polarity.

In the case of d.c. bias the rotor may also be provided with magnetic pole segments which each present the same polarity face to the stator.

The segments of the rotors of FIGS. 3 or 6 may be provided with portions along their radial extending edges which are bent substantially at right angles to the face of the rotor along a radial axis. This can provide for improved efficiency of operation in some circumstances. The segments of the rotors may be provided with one or more circumferentially extending slots in extremities of the segments.

It will be understood that the above description of the present invention is susceptible to various modification changes and adaptations.

What is claimed is:

1. An alternating current electric motor comprising a stator and a substantially flat armature of magnetic material adapted to move relative to the stator and having a plurality of sections mutually spaced in the direction of intended movement of the armature the stator having a plurality of poles having coplanar polefaces spaced apart in the direction of travel of the armature all of which polefaces are spaced from and face one side only of the armature, and at least one winding wound upon the stator and so arranged that on energisation of the winding by an alternating current all of the polefaces are of like polarity and the relative flux density of adjacent ones of the polefaces is caused to alternate without polarity change about a mean value, thereby to induce movement of the armature relative to the stator.

2. An alternating current electric motor comprising a stator and a substantially flat armature of magnetic material adapted to move relative to the stator and having a plurality of sections mutually spaced in the direction of intended movement of the armature, the stator having a plurality of poles having coplanar polefaces spaced apart in the direction of travel of the armature all of which polefaces are spaced from and face one side only of the armature the poles being situated in adjacent pairs which have their faces offset to opposite sides of an axis extending in the direction of intended movement of the armature and at least one winding wound upon the stator and so arranged that on energisation of the winding by an alternating current all of the polefaces are of like polarity and the relative flux density of adjacent ones of the polefaces is caused to alternate without polarity change about a mean value, thereby to induce movement of the armature relative to the stator.

3. An electric motor in accordance with claim 1 or 2, wherein said poles are formed by permanent magnets and like polarity faces of the permanent magnets form said polefaces.

4. An electric motor in accordance with claim 1 or 2, wherein the stator is adapted to be biased by a d.c. current in order to provide said polefaces of like polarity.

5. An electric motor in accordance with claim 1 or 2, wherein the polefaces are arranged to provide a flux density bias of said like polarity of magnitude substantially equal to the amplitude of alternating flux produced by said alternating current.

6. An electric motor in accordance with claim 1 or 2, wherein the armature is in the form of a flat vane and is spaced from the stator by an air gap of width substantially equal to the thickness of the armature.

7. A motor in accordance with claim 2, wherein said pole pairs are also relatively displaced in the direction of intended movement of the armature.

8. An electric motor in accordance with claim 1, 2 or 7, wherein the stator poles are coplanar and lie in a plane perpendicular to the axis of rotation of the rotor.

9. A rotary electric motor in accordance with claim 7, wherein the armature comprises a rotor in which said sections comprise parts of a segment alternate ones of which are defined by outer and intermediate pitch circle diameters and intermediate and inner pitch circle diameters respectively and said polefaces are aligned alternately between outer and intermediate pitch circle diameters and intermediate and inner pitch circle diameters respectively.

10. A rotary electric motor in accordance with claim 2, wherein the armature comprises a rotor in which said sections each comprise a segment of magnetic material which extends radially of the axis of rotation of the rotor and the stator has stator poles arranged around the axis of rotation of the rotor so that upon rotation thereof each rotor segment intersects the magnetic flux of each poleface in turn.

11. An electric motor in accordance with claim 10 or 9 wherein the stator comprises a circular core, an annular coaxial groove is provided in the core so as to separate an annular outer core portion coaxial with the axis of rotation of the rotor and an inner core portion concentric with the outer element, the polefaces being provided on said core portions and the or each winding being located in the groove.

12. An electric motor in accordance with claim 10 or 9 wherein the extremities of the segments of the rotor are bent to reduce the air gap between rotor and stator.

13. An electric motor in accordance with claim 10 or 9 wherein one or more circumferentially extending slots are provided in extremities of the segments.

14. An electric motor in accordance with claim 10 or 9 wherein the stator poles comprise permanent magnet segments arranged at equal angular intervals around the axis of rotation of the rotor.

15. An electric motor in accordance with claim 12, wherein the stator pole segments have equal angular width.

16. An electric motor in accordance with claim 15, wherein the angular width of the rotor sections is the same as that of the stator polefaces.

17. An electric motor in accordance with claim 16, wherein the number of rotor sections is one half the number of stator polefaces, the rotor sections being spaced apart by spaces of the same angular width as the rotor segments themselves.

18. An electric motor in accordance with claim 11, wherein the stator poles are superimposed on said inner and outer core portions so that the poles carried by the inner core portion alternate with those carried by the outer core portion around the axis of the core.

* * * * *